(12) United States Patent
Bhatia et al.

(10) Patent No.: US 8,028,269 B2
(45) Date of Patent: Sep. 27, 2011

(54) COMPLIANCE MANAGEMENT METHOD AND SYSTEM

(75) Inventors: Ritu Bhatia, Cary, NC (US); Derek M. Jennings, Wake Forest, NC (US); Lyle Smith Simons, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 11/684,043

(22) Filed: Mar. 9, 2007

(65) Prior Publication Data

US 2008/0222631 A1 Sep. 11, 2008

(51) Int. Cl.
*G06F 9/44* (2006.01)
(52) U.S. Cl. .................... 717/103; 717/101; 717/106
(58) Field of Classification Search .................. None
See application file for complete search history.

(56) References Cited

U.S. PATENT DOCUMENTS

| | | | |
|---|---|---|---|
| 7,209,927 B2 * | 4/2007 | Donatelli et al. | 707/694 |
| 2004/0249842 A1 * | 12/2004 | D'Alo et al. | 707/100 |
| 2006/0101027 A1 * | 5/2006 | Hotchkiss | 707/100 |
| 2006/0195819 A1 * | 8/2006 | Chory et al. | 717/117 |
| 2007/0006161 A1 * | 1/2007 | Kuester et al. | 717/126 |
| 2007/0094638 A1 * | 4/2007 | DeAngelis et al. | 717/107 |

OTHER PUBLICATIONS

Aguilar-Ruiz, Jesus; Ramos, Isabel; Riquelme, Jose; Toro, Miguel. "An evolutionary approach to estimating software development projects." Copyright 2001.*
Li, Shenmin; Zhou, Yuanyuan. "PR-Miner: Automatically Extracting Implicit Programming Rules and Detecting Violations in Large Software Code." Copyright 2005.*
Spanoudakis, George; Zisman, Andrea. "Inconsistency Management in Software Engineering: Survey and Open Research Issues." Published 2001.*
Florak, William; Park, Robert; Carleton, Anita. "Practical Software Measurement: Measuring for Process Management and Improvement." Published 1997.*

* cited by examiner

*Primary Examiner* — Wei Zhen
*Assistant Examiner* — Adam Banes
(74) *Attorney, Agent, or Firm* — Schmeiser, Olsen & Watts; John R. Pivnichny (57) ABSTRACT

A compliance method and system. The method includes receiving by computing system compliance data comprising a plurality of compliance rules from a plurality of different compliance domains. The plurality of compliance rules are converted from said text format to a first plurality of program objects. Attributes for the first plurality of program objects are modified. A compliance report comprising an output of the plurality of program objects is generated. An automated compliance verification software tool compares the first plurality of program objects with compliance verification data in order to verify if the first plurality of program objects is in accordance with the compliance verification data.

24 Claims, 6 Drawing Sheets

COMPLIANCE MANAGEMENT METHOD AND SYSTEM

FIELD OF THE INVENTION

The present invention relates to a method and associated system for accepting and consolidating inputs for various domains of compliance and mapping the inputs to development objects.

BACKGROUND OF THE INVENTION

Maintaining structure for software development typically comprises a complicated and inefficient process with little flexibility. Accordingly, there exists a need in the art to overcome the deficiencies and limitations described herein above.

SUMMARY OF THE INVENTION

The present invention provides a compliance method comprising:

receiving, by a computing system comprising a compliance software application, compliance data, said compliance data comprising a plurality of compliance rules from a plurality of different compliance domains, said plurality of compliance rules comprising a text format;

consolidating, by said compliance software application, said plurality of compliance rules;

converting, by said compliance software application, said plurality of compliance rules from said text format to a first plurality of program objects;

modifying, by said compliance software application, attributes for said first plurality of program objects;

generating, by said compliance software application, a group of compliance standards, said group of compliance standards comprising said first plurality of program objects;

generating, by said compliance software application, a compliance report comprising an output of said first plurality of program objects, said output of said first plurality of program objects comprising verification data;

enabling, by said compliance software application, an automated compliance verification software tool within said compliance software application;

comparing, by said automated compliance verification software tool, said first plurality of program objects with said compliance verification data;

verifying, by said automated compliance verification software tool, if said first plurality of program objects is in accordance with said compliance verification data;

enforcing, by said automated compliance verification software tool, compliance of a second plurality of program objects with said first plurality of program objects; and aggregating, by said automated compliance verification software tool, said compliance verification data.

The present invention provides a computing system comprising a processor coupled to a computer-readable memory unit, said memory unit comprising a compliance software application and instructions that when executed by the processor implement a compliance method, said method comprising:

receiving, by said computing system, compliance data, said compliance data comprising a plurality of compliance rules from a plurality of different compliance domains, said plurality of compliance rules comprising a text format;

consolidating, by said compliance software application, said plurality of compliance rules;

converting, by said compliance software application, said plurality of compliance rules from said text format to a first plurality of program objects;

modifying, by said compliance software application, attributes for said first plurality of program objects;

generating, by said compliance software application, a group of compliance standards, said group of compliance standards comprising said first plurality of program objects;

generating, by said compliance software application, a compliance report comprising an output of said first plurality of program objects, said output of said first plurality of program objects comprising verification data;

enabling, by said compliance software application, an automated compliance verification software tool within said compliance software application;

comparing, by said automated compliance verification software tool, said first plurality of program objects with said compliance verification data;

verifying, by said automated compliance verification software tool, if said first plurality of program objects is in accordance with said compliance verification data;

enforcing, by said automated compliance verification software tool, compliance of a second plurality of program objects with said first plurality of program objects; and aggregating, by said automated compliance verification software tool, said compliance verification data.

The present invention provides process for supporting computer infrastructure, said process comprising providing at least one support service for at least one of creating, integrating, hosting, maintaining, and deploying computer-readable code in a computing system comprising a memory unit, said memory unit comprising a compliance software application, wherein the code in combination with the computing system is capable of performing a compliance method, said method comprising:

receiving, by said computing system, compliance data, said compliance data comprising a plurality of compliance rules from a plurality of different compliance domains, said plurality of compliance rules comprising a text format;

consolidating, by said compliance software application, said plurality of compliance rules;

converting, by said compliance software application, said plurality of compliance rules from said text format to a first plurality of program objects;

modifying, by said compliance software application, attributes for said first plurality of program objects;

generating, by said compliance software application, a group of compliance standards, said group of compliance standards comprising said first plurality of program objects;

generating, by said compliance software application, a compliance report comprising an output of said first plurality of program objects, said output of said first plurality of program objects comprising verification data;

enabling, by said compliance software application, an automated compliance verification software tool within said compliance software application;

comparing, by said automated compliance verification software tool, said first plurality of program objects with said compliance verification data;

verifying, by said automated compliance verification software tool, if said first plurality of program objects is in accordance with said compliance verification data;

enforcing, by said automated compliance verification software tool, compliance of a second plurality of program objects with said first plurality of program objects; and aggregating, by said automated compliance verification software tool, said compliance verification data.

The present invention provides a computer program product, comprising a computer usable medium comprising a computer readable program code embodied therein, said computer readable program code adapted to implement a compliance method within a computing system comprising a memory unit, said memory unit comprising a compliance software application, said method comprising:

receiving, by said computing system, compliance data, said compliance data comprising a plurality of compliance rules from a plurality of different compliance domains, said plurality of compliance rules comprising a text format;

consolidating, by said compliance software application, said plurality of compliance rules;

converting, by said compliance software application, said plurality of compliance rules from said text format to a first plurality of program objects;

modifying, by said compliance software application, attributes for said first plurality of program objects;

generating, by said compliance software application, a group of compliance standards, said group of compliance standards comprising said first plurality of program objects;

generating, by said compliance software application, a compliance report comprising an output of said first plurality of program objects, said output of said first plurality of program objects comprising verification data;

enabling, by said compliance software application, an automated compliance verification software tool within said compliance software application;

comparing, by said automated compliance verification software tool, said first plurality of program objects with said compliance verification data;

verifying, by said automated compliance verification software tool, if said first plurality of program objects is in accordance with said compliance verification data;

enforcing, by said automated compliance verification software tool, compliance of a second plurality of program objects with said first plurality of program objects; and aggregating, by said automated compliance verification software tool, said compliance verification data.

The present invention advantageously provides a method and associated system capable of maintaining structure for software development.

DETAILED DESCRIPTION OF THE INVENTION

Figure 1:
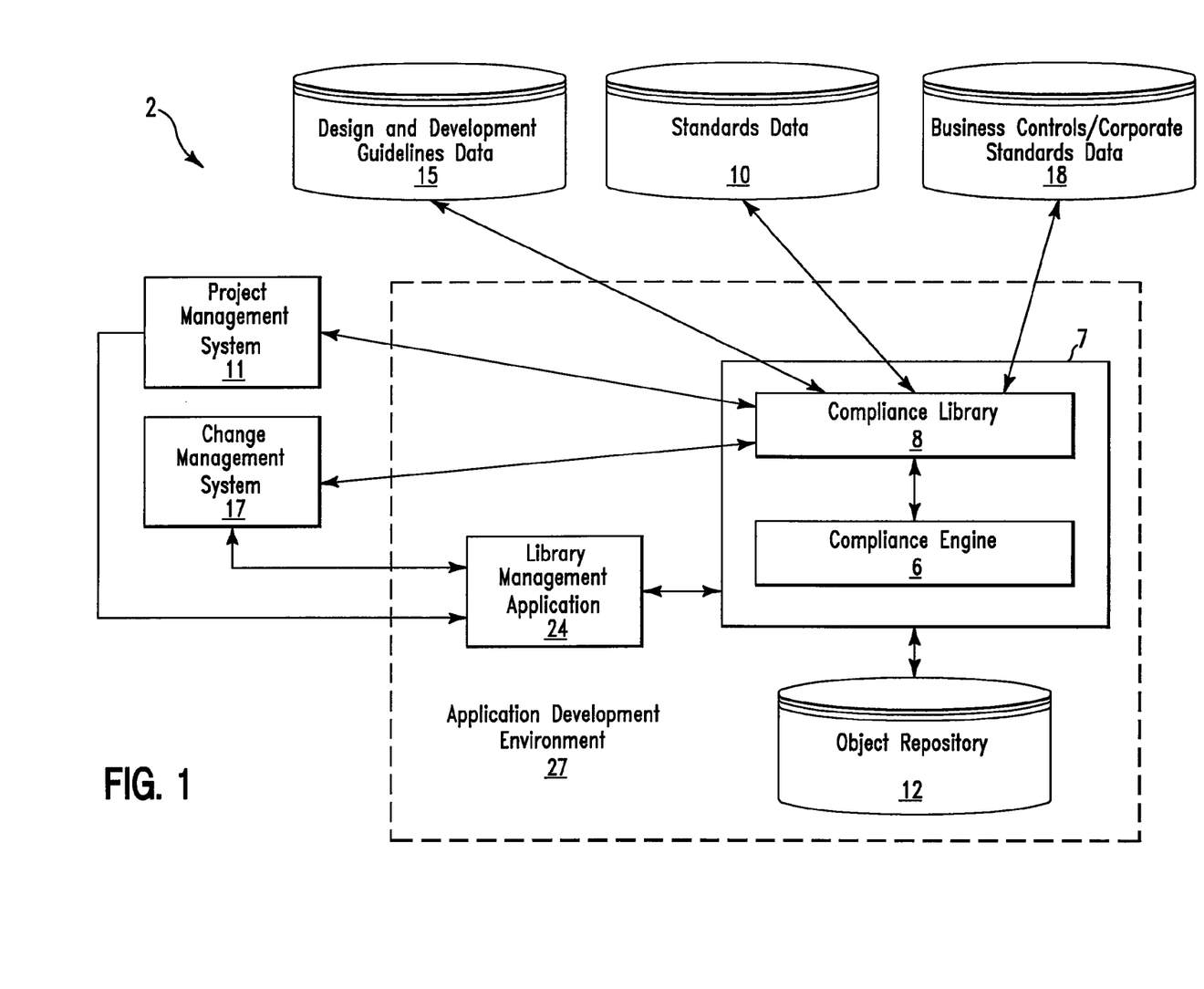
FIG. 1 illustrates a block diagram of a compliance management system, in accordance with embodiments of the present invention.

FIG. 1 illustrates a block diagram of a compliance management system 2, in accordance with embodiments of the present invention. Compliance management system 2 comprises a compliance software system 7, databases 10, 15, 18, and 12, a library management (software) application 24, a project management system 11, and a change management system 17. Compliance software system 7 comprises a compliance library 8 and a compliance engine 6. Library management application 24 controls access to development objects and sub-objects, providing sequencing, version management, and restriction of edit authority. Library management application 24 interfaces with database 12 (i.e., object repository). Object repository refers to a catalog of all program objects and sub-objects including their interrelationships. Compliance software system 7 interfaces with library management application 24 within an application development environment(s) 27. Compliance software system 7 accepts and consolidates data from databases 10 (i.e., design and development guidelines data), 15 (i.e., standards data), and 18 (i.e., business controls/corporate data) for various domains of compliance (e.g., internal standards, external standards, business controls guidelines, performance and data management guidelines, etc). A development guideline comprises a compliance domain associated with the technical aspects of development including standardization of processes (so that new developers can quickly understand the functionality of a program) and optimization of performance and maintainability. Business controls/corporate audit guidelines comprise a compliance domain associated with a company's internal guidelines and governs such areas as security, privacy, and financial controls. The data retrieved from databases 10, 15, and 18 is stored within compliance library 8. Compliance engine 6 maps the consolidated data in database 12 (i.e., object repository) to development objects, change records, and product releases (groupings of development changes). Compliance software system 7 is connected to a change management system 17 so that new or changed code is not allowed to move through application development environment(s) 27 if a compliance record for the new or changed code has not been located. Change management system 17 manages the movement of software application changes through various phases from a problem determination/change request through requirements validation, development, testing and promotion to production. Additionally, compliance software system 7 allows for compliance reporting for all managed development environments, issuing a score that may be viewed at a program, business function, release, developer, development team, or department level. When standards are changed or new domains (sets of guidelines such as those corresponding to an ISO standard or CMM attainment level) are added, an entire repository of objects (i.e., within database 12) may be reviewed against the new criteria and an assessment schedule is generated. The assessment schedule may be incorporated into an assessment plan in order to bring all objects into compliance with the new standard. Compliance software system 7 allows for the following functionality:

1. Consolidation of compliance rules (i.e., a granular level of compliance checking for a standard within a domain. For example a Rule may be "all date variables must be stored as eight digits in length in the database, although they may be truncated for display in applications) from multiple compliance domains (i.e., major grouping/source of a compliance standard, (a specific standard or set of guidelines within a Compliance Domain, e.g., Business Controls, Development Guidelines, Corporate Standards, Industry Standards) including development guidelines, corporate controls, industry and governmental standards into centralized compliance library 8. Industry standards comprise a compliance domain which is external to a company. These are often useful for certification (of a company's product, or capabilities) and are adhered to in order to improve interoperability of applications and systems, as well as attest to a specified level of quality.

2. Translation of semantic compliance rules into programmatic format (i.e., program objects).
   A. Compliance rules are entered as text into compliance system 2 (e.g., "All end-user parameter variables for Java applications must adhere to the naming convention of 'P_name', where the first two characters of the variable name comprise a capital 'P' followed by an underscore '_').
   B. Compliance rules may be generated by modifying a template rule (i.e., a pre-supplied or cloned rule from any existing rule in compliance library 8) or by entering text data directly.
   C. For new (i.e., non-template/cloned) rules, compliance library 8 will suggest a programmatic form based upon a stored list of keyword transformations.
      C1. Compliance Library learns new keyword transformations and adds to a stored list.
      C2. Suggested programmatic format of a compliance rule is text generated in compliance library 8. Actual programmatic form is generated in compliance engine(s) 6 based upon acceptance of the rule.

3. Ability to define and modify attributes of compliance rules.
   A. A scope attribute designates a compliance rule (or aggregate of rules) as applicable to any combination (including multiples) of:
      A1. A specified programming language (e.g., Java, XML, C++, etc)
      A2. A specified project (e.g., global call center, financial ledger consolidation, software manufacturing, etc)
      A3. A specified development system or environment (e.g., GP1, e-Business Sysplex, Global Intranet, etc)
      A4. A specified platform (e.g., UNIX, Linux, Windows, mainframe machines, etc)
   B. Priority attribute of a compliance rule (or aggregate of rules) allows for designation as follows:
      B1. Mandatory/Immediate—Compliance must be enforced for all systems in a Scope. Change, project and library management systems will be updated to prevent movement of any non-compliant development objects to production. Urgent flags and notifications will be sent to developers and managers.
      B2. Mandatory/Urgent—Compliance must be enforced for all systems in a Scope. Change, project and library management systems will be updated to flag movement of any non-compliant development objects to production. Urgent flags and notifications will be sent to developers and managers.
      B3. Mandatory/non-Urgent—Compliance must be enforced for all systems in a scope within a specified time period. Change, project and library management systems will be updated to flag movement of any non-compliant development objects to production. Compliance system 2 will attempt suggest when changes may be made within the project cycle to minimize impact to development, test, and support resources.
      B4. Optional/non-Urgent—Compliance not enforced for systems within a scope. Informational records created in those systems pertaining to the rule.
      B5. Informational/non-binding—No status changes or updates made to systems within a scope. Results stored in compliance library 8 may be used for preliminary assessments of the impact of proposed rules and standards.

4. Flexible creation of aggregated compliance standards (composites of one or more compliance rules and/or existing standards) in the compliance library 8.

5. Creation of compliance reports (i.e., printed reports, computerized reports, etc) based upon a specified rule or aggregate standard.

6. Inheritance of attributes of compliance rules created under a particular standard (e.g., by default, a compliance rule created under the SEI CMM level 5 standard would inherit the scope and priority of that standard with those attributes subject to modification. A compliance rule cloned from an internal use XML development standard could have its scope attribute modified in order to use it to govern external development).

7. Automation of compliance checks of development objects.
   A. Audits and compliance reviews will be streamlined via automation allowing sophisticated analysis of code to be performed by less skilled developers, analysts and architects.
   B. Ambiguous or indeterminate results will be flagged for manual analysis by a skilled analyst thereby greatly minimizing the impacts on these critical resources.

8. Application of compliance checks against program objects and sub-objects at the highest and lowest levels of definition for application development environment 27.
   A. Compliance rule transformations are performed via compliance engine 6 specific to a development environment and may therefore be associated with the level of development objects for said environment.
      A1. Development system/environment attributes exist within compliance library 8 and those characteristics are inputs to the compliance rule transformations.
      A2. As applicable, a compliance rule may be associated with a business function, transaction, program, function module, sub-routine, data definition, table declaration, etc., or any other sub-object existing within a particular development environment.
      A3. System or environmental exemptions may be declared within compliance library 8 in order to prevent inapplicable compliance checks from being performed (i.e., application of rules governing user Interfaces for a backend database environment which is only accessed by other machines).

9. Ability to flexibly report on compliance status across any logical or physical grouping of changes.

10. Ability to perform compliance checks, returning compliance scores via reports vs. a wide range of disparate rules and standards. Applying the appropriate checks at the appropriate phases in change and project management. A Compliance Score comprises a percentage of relevant objects in a development system for which the applicable rule is satisfied.

11. Ability to model impacts of changes to Standards or Rules across development systems or projects 12. Automates determination of compliance scores for development environments and projects. Providing development quality metrics and an IT compliance view across the entire company 13. Ability to perform compliance checks across multiple development environments and/or projects.

14. Ability to drive the workflow of project management system 11 and/or change management system 17 based upon results of compliance rules and checks. Project management system 11 manages the progress of projects through their various phases (e.g. concept, development, test, and deploy). Projects are defined as groups of changes which may span multiple development environments and systems and fulfill some purpose such as a software release, repair, or functional enhancement.

15. Ability to update status of management system 11 and/or change management system 17 based upon results of compliance rules and checks.

16. Ability to report compliance status of specific projects.

The following description describes architecture and interfaces for compliance software system 7. In FIG. 1, multiple-sourced compliance standards may be inputted into compliance library 8. Compliance rules may be sourced from different compliance domains (e.g. development procedures, industry standards, corporate audit guidelines, etc) and consolidated within an automated format which may be incrementally updated and used to manage compliance of multiple development and project environments. These various forms of compliance are generally managed independently and may be applied to various phases of a production lifecycle (e.g., a lifecycle may comprise project management, software or systems engineering, manufacturing processes, etc). Compliance software system 7 allows for these compliance rules to be loaded and maintained electronically within the system. Compliance software system 7 allows for compliance reporting at multiple levels of detail for a compliance domain or standard and at multiple levels of detail for an axis of compliance. Compliance software system 7 comprises compliance library 8 and compliance engine 6. Definition of compliance standard rules within the compliance software system 7 allows for creation and maintenance of object relationships between rules, standards, and domains. A translation from the defined compliance rules (in text format) in compliance library 8 into a technical specification which may be checked against objects in the development system occur in compliance engine 6. Compliance rules may comprise attributes determined at: a rules level, a standards level, or an aggregate level, including a user-created grouping of several rules and/or standards. Attributes, such as scope and priority may be assigned at the individual rules level. Alternatively, attributes may be inherited via an assignment made at an aggregate or standards level. For example, a rule for data retention of a specific type of information may be defined with a scope which makes it applicable only to internal systems, wherein another rule may govern all systems and development environments). Compliance scores at a rules level are calculated in compliance engine 6 and stored in compliance library 8. Aggregation and further calculations may be performed as well as detailed reporting. Compliance library 8 interfaces with compliance engine 6 which in turn interfaces with library management application 24 and database 12 (i.e., object repository) within application development environment 27. Compliance engine 6 may be centralized or distributed. For complex development environments with robust library management systems (e.g., SAP or other ERP packaged software applications), compliance engine 6 may be distributed (i.e., existing as part of a code-base or as a plug-in to the environment/application) to facilitate tighter coupling with database 12. Compliance engine 6 performs compliance checks against a source code of a software development environment using the rules in compliance library 8. Results of the compliance checks are scored against development objects for relevance and compliance. The scores are maintained within compliance library 8. Compliance software system 7 interacts directly with the individual program objects and sub-objects which compose the application or development system.

Compliance software system 7 comprises an interface to change management system(s) 17. Change management system 17 manages the movement of application changes through various phases and physical stages within a development landscape. Various compliance rules are used to determine the movement of the changes. At different stages within a change management process, developers, business analysts, and end users perform different checks with most updates to change management system 17 occurring manually (e.g. updating a positive test case to enable a change to move from the test system to production). Compliance software system 7 performs repetitive automated checks at each stage and updates the change management system 17. If a manual process is used, compliance software system 7 may perform all updates to automatically pass the status of the library management application 24 to change management system 17. If a direct interface exists between change management system 17 and library management application 24, compliance engine 6 may be configured to only pass a subset of compliance check information back to change management system 17.

Compliance software system 7 comprises an interface to project management system(s) 11. Many types of compliance checks are directly relevant to entry and exit from different phases within project management and therefore Compliance software system 7 may interface with one or many project management systems. Compliance software system 7 may receive information (i.e., related to a relationship between new or changed program objects to projects) from the project management system 11 which in turn, relates to a particular development system or systems. Compliance software system 7 may also update project management system 11 with the results of the various checks. At different stages within a project management process, developers, business analysts, and end users perform different checks with project management system 11 usually consisting of a standalone database updated manually to reflect an actual status in the development environment(s). Compliance software system 7 may automate these checks based upon a configuration present in the compliance library 8. If a direct link exists between project management system 11 and library management application 24, compliance software system 7 may be configured to only pass a subset of compliance check information back to project management system 11.

Compliance software system 7 comprises an interface to library management application 24 and database 12 (i.e., object repository). Rules from compliance library 8 are translated within compliance engine 6 into programmatic form so that they may be used to perform checks versus all of objects in database 12 (i.e., object repository). Compliance engine 6 performs a scan of the program objects within database 12 in order to test for relevance and compliance. A per object per rule status is returned to compliance library 8 where it may be further parsed or aggregated. Depending upon a configurable priority setting for a given rule, flags may be set within compliance library 8 which may result in actions taken within the database 12 (i.e., object repository), library management application 24, change management system 17 and/or project management system 11. The flags control the movement of the code based upon those criteria. A flag set due to failure of a critical rule check for a particular object (or group of objects) may result in the corresponding change or project being halted at the current phase or even moved back to a previous phase. For a lesser priority exception, the appropriate updates will be made to the governing databases and/or library management application informing the developers of the status and prompting them to bring the object(s) into compliance the next time the code is worked on. Definition, configuration and prioritization of the compliance rules occur at a semantic level in compliance library 8 and are translated to a programmatic level within compliance engine 6. All development objects and sub-objects are analyzed and the data is returned back to compliance library 8 where individual compliance and relevance scores are aggregated to span standards, domains, or customized views of same.

The following description illustrates an example of for implementing compliance management system 2 of FIG. 1 to accept an updated corporate standard that creates a new rule and changes another rule. In the example, a company with an existing corporate standard IT4080 must implement one change to a rule within the standard and one new rule underneath the standard. The change applies to password lengths which must be increased from six characters to ten characters for all IT systems. The company has compliance management system 2 running as their internal procurement ERP system as well as for an external web portal. The other rule change involves adding two lines of text containing a copyright statement into the comments header of any top-level program objects.

For the first rule change, the rule already existed to ensure that password variables contained at least six characters and it was given the highest priority and universal scope. As such, there was 100% Compliance as no code could pass the development code review or later milestone with that condition unsatisfied. Any newly created password variables were automatically tested versus that rule and flagged to the developers if found to be non-compliant. When the rule was changed to ten characters, a new compliance report was executed which returned scores of 28% for the ERP system and 90% for the web portal (in 28% of cases, developers had already exceeded the previous standard and, for the web portal, a web-specific rule which was part of another standard had driven a high level of compliance there). By reviewing the relevance score on the non-compliant objects (and cross-referencing with project management system 11 to see if there were any pending changes to those objects), the customer is able to determine that 65% of the changes may be made as part of an upcoming functional deployment by assigning the highest priority attribute to this rule implementation. The other 35% of the necessary changes to bring the application into compliance may be estimated (to determine development expense) and added to the upcoming deployment without overhead to the testing costs of the project.

For the second rule change (i.e., adding a new rule), no overlapping rules existed so therefore there is 0% compliance across the two development environments. There is no imminent business risk associated with non-compliance and the company wishes to phase it in as a low-cost impact, evolutionary change. The rule is loaded into compliance library 8 as a lowest priority (i.e., meaning that it will prompt developers when they open up an object for change) but will not hinder movement between milestones or phases for project or change Management of non-compliant objects. For a subset of objects within the repository of the ERP system, a macro automates the comments header update, bringing the compliance score within the development environment to 27% for relevant objects with no action required from developers.

In both cases (i.e., first rule change and second rule change), the necessary changes are made and tracked in all appropriate systems, significantly minimizing the efforts needed from compliance teams and allowing them to be multi-disciplinary (i.e., working across multiple domains, e.g., development guidelines and corporate controls). Further savings are realized by the alignment with project and change Management by bundling required compliance changes into existing releases and thereby reducing unique expenses for testing and code promotion.

Figure 2:
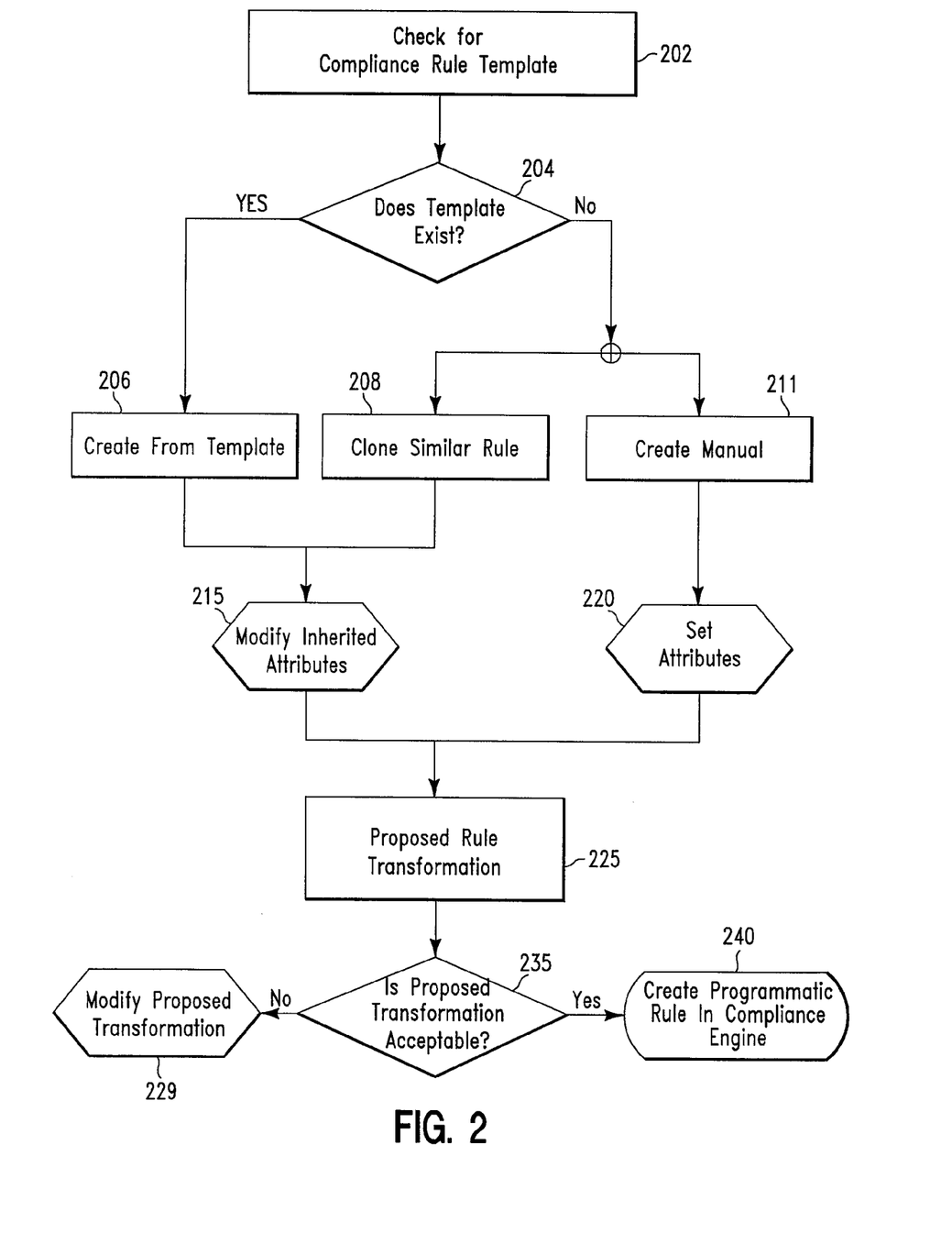
FIG. 2 illustrates a flowchart describing an algorithm for generating a compliance rule within the compliance management system of FIG. 1, in accordance with embodiments of the present invention.

FIG. 2 illustrates a flowchart describing an algorithm for generating a compliance rule within compliance management system 2 of FIG. 1, in accordance with embodiments of the present invention. In step 202, compliance management system 2 is checked for a compliance rule template. In step 204, it is determined if a suitable compliance rule template exist for a desired compliance rule.

If in step 204, it is determined that a suitable compliance rule template exists for the desired compliance rule then in step 206, the desired compliance rule is generated from the template and step 215 is executed as described, infra. The desired compliance inherits attributes and suggested programmatic format from the template.

If in step 204, it is determined that a suitable compliance rule template does not exist for the desired compliance rule then either step 208 or step 211 is performed.

In step 208, a compliance rule is generated by cloning a similar rule. The compliance rule may be generated as a standalone compliance rule that is part of the same standard as the rule it was cloned from. Alternatively the compliance rule may be assigned to another standard. In step 215, the compliance rule inherits attributes and suggested programmatic format from the selected template.

In step 211, a compliance rule is generated manually. In step 220, scope and priority attributes are selected for the compliance rule from a selection list.

In step 225, the generated proposed rule transformation is viewed. In step 235, it is determined if the proposed rule transformation is acceptable.

If in step 235, it is determined that the proposed rule transformation is not acceptable then in step 229 the proposed rule transformation is modified in step 229 and step 225 is repeated. The transformation may be modified based upon existing examples in compliance library 8. If there are no suitable examples existing, then a custom process may be required to generate a programmatic compliance rule which will return the desired results.

If in step 235, it is determined that the proposed rule transformation is acceptable then in step 240 a programmatic rule is generated within compliance engine 6.

Figure 3:
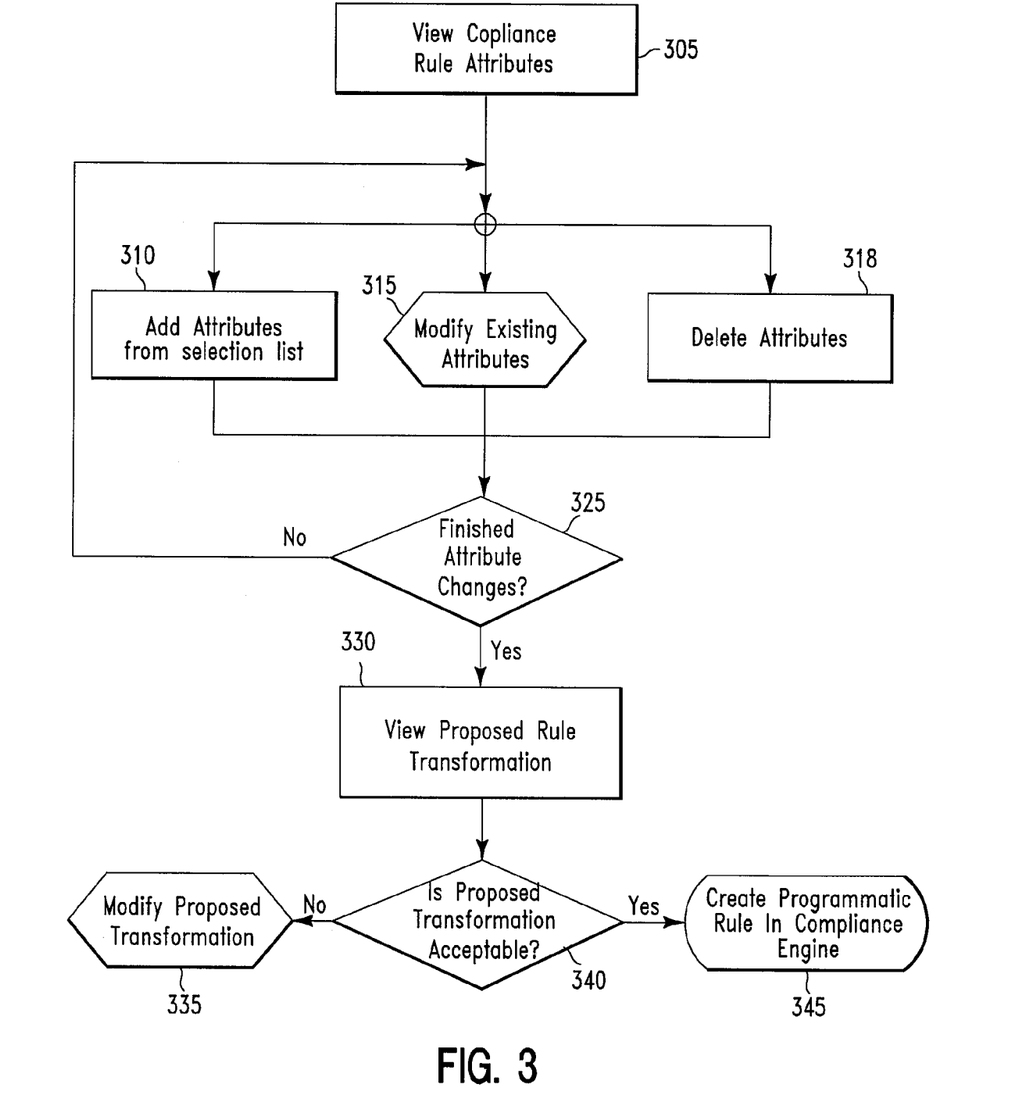
FIG. 3 illustrates a flowchart describing an algorithm for altering or modifying a compliance rule within the compliance management system of FIG. 1, in accordance with embodiments of the present invention.

FIG. 3 illustrates a flowchart describing an algorithm for altering or modifying a compliance rule within compliance management system 2 of FIG. 1, in accordance with embodiments of the present invention. In step 305, attributes for the compliance rule (i.e., to be modified) are viewed and one of steps 310, 315, and 318 are executed.

In step 310, attributes from a selection list are added to the compliance rule.

In step 315, existing attributes for the compliance rule are modified.

In step 318, existing attributes for the compliance rule are deleted.

In step 325, it is determined if attribute changes for the compliance rule have been completed. If in step 325, it is determined if attribute changes for the compliance rule have not been completed then step one of steps 310, 315, or 318 is repeated. If in step 325, it is determined if attribute changes for the compliance rule have been completed then in step 330, the proposed rule transformation is viewed.

In step 340, it is determined if the proposed rule transformation is acceptable. If in step 340, it is determined that the proposed rule transformation is not acceptable then in step 335, the proposed rule transformation is modified in step 335 and step 330.

If in step 340, it is determined that the proposed rule transformation is acceptable then in step 345, a programmatic rule is generated within compliance engine 6.

Figure 4:
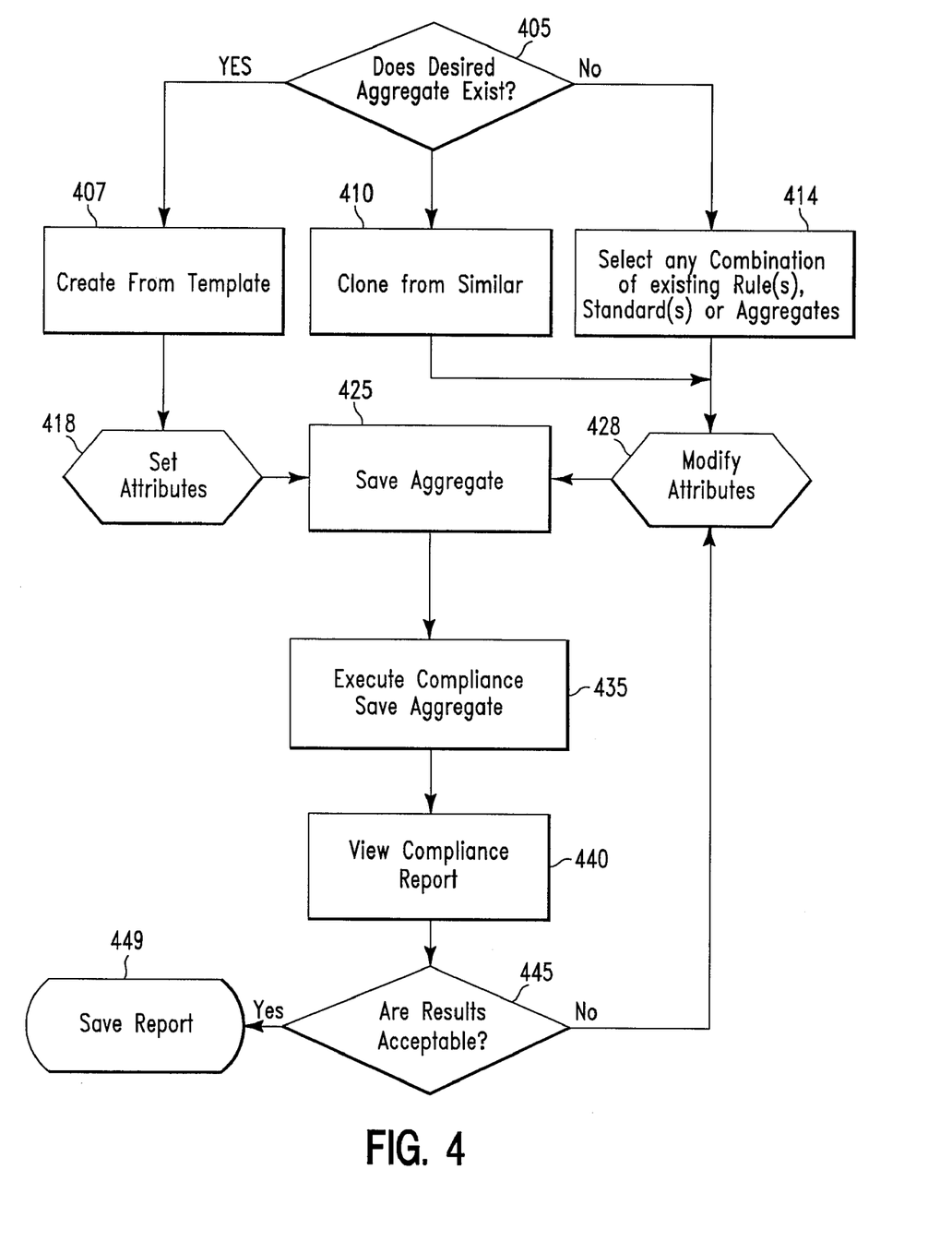
FIG. 4 illustrates a flowchart describing an algorithm for executing an aggregated compliance check within the compliance management system of FIG. 1, in accordance with embodiments of the present invention.

FIG. 4 illustrates a flowchart describing an algorithm for executing an aggregated compliance check within compliance management system 2 of FIG. 1, in accordance with embodiments of the present invention. In step 405, it is determined if a desired aggregate exists.

If in step 405, it is determined that a desired aggregate exists then in step 407, a compliance aggregate is created from a template. Attributes may be inherited from the template. In step 418, attributes are set and step 425 is executed as described, infra.

If in step 405, it is determined that a desired aggregate does not exist then either step 410 or step 414 is executed. In step 410, an aggregate is cloned and inherits attributes from a similar template and in step 428 attributes are modified. In step 414, a combination of existing rule(s), standard(s), and/or aggregates is selected and step 428 is executed as described, supra. Aggregates represent a group of compliance rules which may be checked at once against a development environment and it's associated workflow systems. An aggregate may be created by combining other standards, aggregates, rules, or any combination thereof.

In step 425, the aggregate is saved within compliance library 8. In step 435, a compliance check for the aggregate is executed. In step 440, a compliance report is generated and viewed. In step 445, it is determined if the results viewed on the compliance report are acceptable. If in step 445, it is determined if the results viewed on the compliance report are not acceptable then step 428 is repeated. If in step 445, it is determined if the results viewed on the compliance report are not acceptable then in step 449, the compliance report is saved within compliance management system 2 of FIG. 1.

Figure 5:
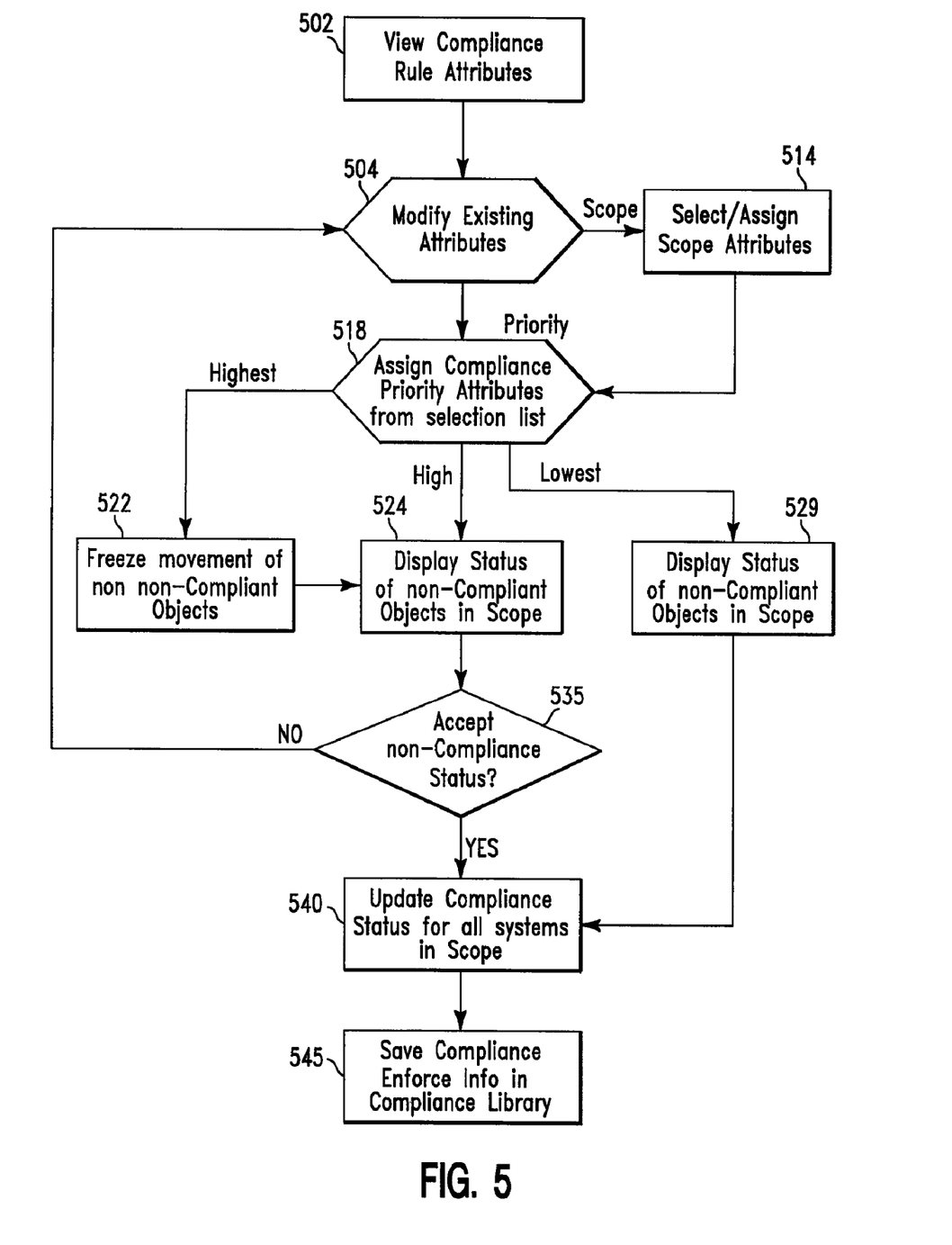
FIG. 5 illustrates a flowchart describing an algorithm for enforcing a compliance rule within the compliance management system of FIG. 1, in accordance with embodiments of the present invention.

FIG. 5 illustrates a flowchart describing an algorithm for enforcing a compliance rule within compliance management system 2 of FIG. 1, in accordance with embodiments of the present invention. In step 502, compliance rule attributes are viewed. In step 504, compliance rule attributes are modified. In step 514, scope attributes are selected/assigned to the compliance rule. A scope attribute comprises attributes related to development systems, applications, projects, as defined in linked systems (e.g., change management, project management, library management, etc), etc. In step 518, priority attributes (levels) are assigned. Priority attributes may comprise:
1. Mandatory/Immediate
2. Mandatory/Urgent
3. Mandatory/non-Urgent
4. Optional/Clone Aggregate from Similar
5. Informational/non-binding Depending on a priority level assigned in step 518, step 522, 524, and/or 529 is executed. In step 522, movement of non-Compliant Objects for all (Project, Change, Library Management) systems in scope are locked. Two-way interfaces are generated to corresponding system(s) notifications of developers and management.

In step 524, a status of non-compliant objects in the scope is displayed and step 535 is executed as described, infra.

In step 529, a status of non-compliant objects in the scope is displayed and step 540 is executed as described, infra.

In step 535, it is determined if a non-compliant status is accepted. If in step 535, it is determined that a non-compliant status is not accepted then step 504 is repeated. If in step 535, it is determined that a non-compliant status is accepted then in step 540, a compliance status for all systems in the scope is updated. In step 545 compliance enforcement information (e.g., a report) is saved within compliance library 8.

Figure 6:
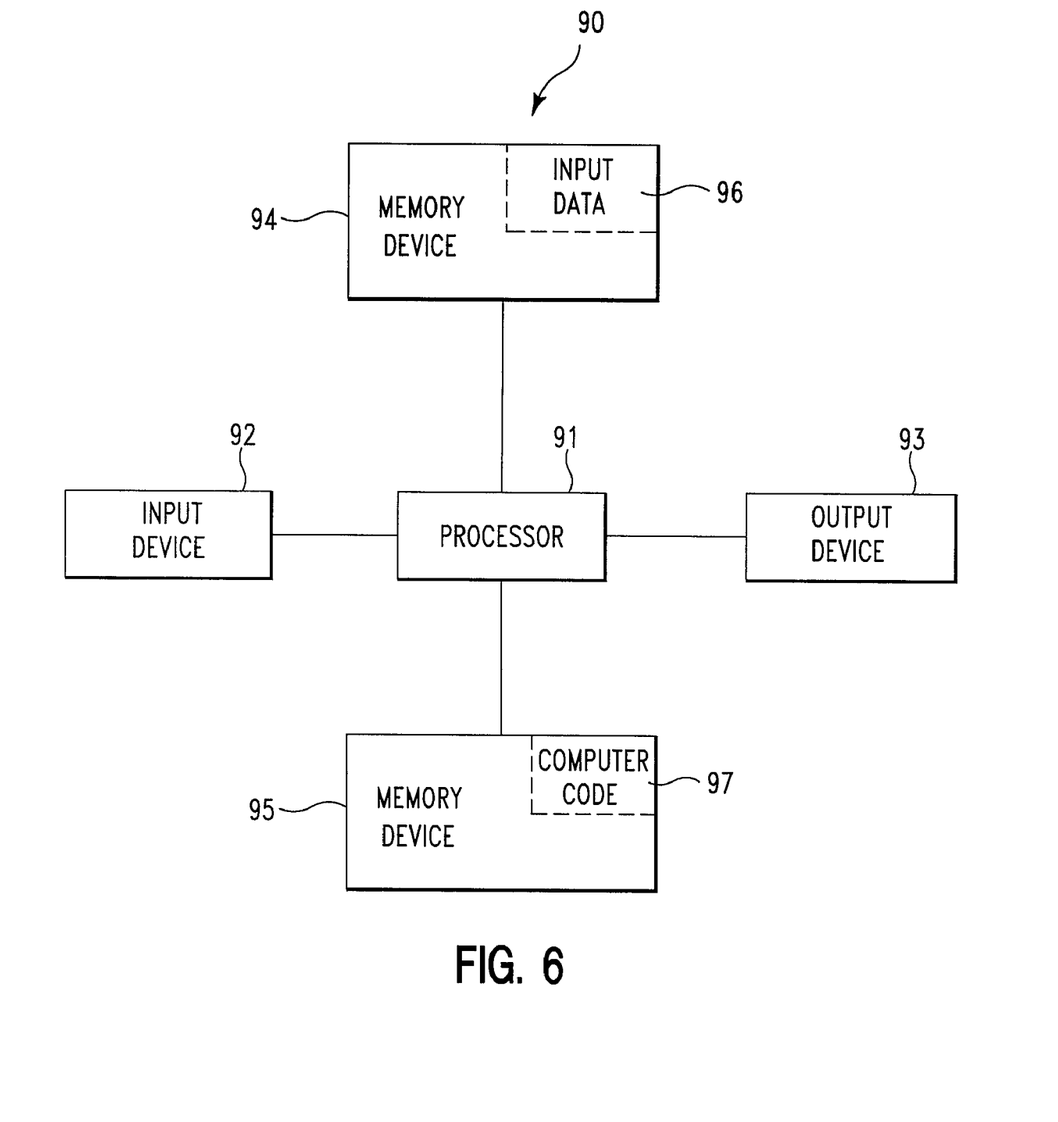
FIG. 6 illustrates a computer apparatus used for accepting and consolidating inputs for various domains of compliance and mapping the inputs to development objects, in accordance with embodiments of the present invention.

FIG. 6 illustrates a computer apparatus 90 used for accepting and consolidating inputs for various domains of compliance and mapping the inputs to development objects, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithms of FIGS. 2-5) for accepting and consolidating inputs for various domains of compliance and mapping the inputs to development objects. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to accept and consolidate inputs for various domains of compliance and map the inputs to development objects. Thus the present invention discloses a process for deploying or integrating computing infrastructure, comprising integrating computer-readable code into the computer system 90, wherein the code in combination with the computer system 90 is capable of performing a method for accepting and consolidating inputs for various domains of compliance and mapping the inputs to development objects. In another embodiment, the invention provides a business method that performs the process steps of the invention on a subscription, advertising, and/or fee basis. That is, a service provider, such as a Solution Integrator, could offer to generate a service request comprising contract associations. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A compliance method comprising:
receiving, by a computing system comprising a computer processor, a compliance software application, compliance data, said compliance data comprising a plurality of compliance rules from a plurality of different compliance domains, said plurality of compliance rules comprising a text format;
consolidating, by said compliance software application, said plurality of compliance rules;
determining, by said compliance software application, a programmatic format for said plurality of compliance rules;
converting, by said compliance software application, said plurality of compliance rules from said text format to a first plurality of program objects, said first plurality of program objects comprising said programmatic format;
defining, by said compliance software application, attributes for said first plurality of program objects, wherein said attributes comprise scope attributes and priority attributes, wherein said scope attributes comprise attributes associated with a specified programming language, a specified project, a specified development environment, and a specified operating system platform, and wherein said priority attributes comprise attributes requiring: immediate attention, urgent attention, and non-urgent attention;
modifying, by said compliance software application, said attributes for said first plurality of program objects;
generating, by said computer processor executing said compliance software application, a group of compliance standards, said group of compliance standards comprising a modified version of said first plurality of program objects, said modified version of said first plurality of program objects comprising inherited attributes from a rules template and modified attributes resulting from said modifying;
generating, by said compliance software application, a compliance report comprising an output of said modified version of said first plurality of program objects, said output of said modified version of said first plurality of program objects comprising compliance verification data;
enabling, by said compliance software application, an automated compliance verification software tool within said compliance software application;
comparing, by said automated compliance verification software tool, said modified version of said first plurality of program objects with said compliance verification data;
verifying, by said automated compliance verification software tool, if said modified version of said first plurality of program objects is in accordance with said compliance verification data;
calculating, by said compliance software application, a compliance score for each program object of said modified version of said first plurality of program objects, wherein each said compliance score comprises a percentage of relevant objects in a development system for which an applicable rule is satisfied;
enforcing, by said automated compliance verification software tool, compliance of a second plurality of program objects with said modified version of said first plurality of program objects, said second plurality of program objects comprised by a software application being verified for compliance with said compliance rules; and
aggregating, by said automated compliance verification software tool, said compliance verification data with second compliance verification data comprised by an output of said second plurality of program objects.

2. The method of claim 1, wherein said verifying determines that said modified version of said first plurality of program objects is in accordance with said compliance verification data.

3. The method of claim 1, wherein said verifying determines that at least one program object of said modified version of said first plurality of program objects is not in accordance with said compliance verification data, and wherein said method further comprises:
flagging, by said automated compliance verification software tool, said at least one program object for a manual analysis; and
preventing, by said automated compliance verification software tool, said at least one program object from being associated with said second plurality of program objects.

4. The method of claim 1, further comprising:
generating, by said compliance software application, a new compliance rule, said generating said new compliance rule comprising using at least one attribute of said attributes to modify at least one rule of said first plurality of compliance rules.

5. The method of claim 1, further comprising:
transforming, by said compliance software application, a first program object of said modified version of said first plurality of program objects into a second program object.

6. The method of claim 1, further comprising:
removing, by said compliance software application, at least one attribute of said attributes for at least one program object of said modified version of said first plurality of program objects.

7. A computing system comprising a computer processor coupled to a computer-readable memory unit, said memory unit comprising a compliance software application and instructions that when executed by the processor implement a compliance method, said method comprising:
receiving, by said computing system, compliance data, said compliance data comprising a plurality of compliance rules from a plurality of different compliance domains, said plurality of compliance rules comprising a text format;
consolidating, by said compliance software application, said plurality of compliance rules;
determining, by said compliance software application, a programmatic format for said plurality of compliance rules;
converting, by said compliance software application, said plurality of compliance rules from said text format to a first plurality of program objects, said first plurality of program objects comprising said programmatic format;
defining, by said compliance software application, attributes for said first plurality of program objects, wherein said attributes comprise scope attributes and priority attributes, wherein said scope attributes comprise attributes associated with a specified programming language, a specified project, a specified development environment, and a specified operating system platform, and wherein said priority attributes comprise attributes requiring; immediate attention, urgent attention, and non-urgent attention;

modifying, by said compliance software application, said attributes for said first plurality of program objects;

generating, by said computer processor executing said compliance software application, a group of compliance standards, said group of compliance standards comprising a modified version of said first plurality of program objects, said modified version of said first plurality of program objects comprising inherited attributes from a rules template and modified attributes resulting from said modifying;

generating, by said compliance software application, a compliance report comprising an output of said modified version of said first plurality of program objects, said output of said modified version of said first plurality of program objects comprising compliance verification data;

enabling, by said compliance software application, an automated compliance verification software tool within said compliance software application;

comparing, by said automated compliance verification software tool, said modified version of said first plurality of program objects with said compliance verification data;

verifying, by said automated compliance verification software tool, if said modified version of said first plurality of program objects is in accordance with said compliance verification data;

calculating, by said compliance software application, a compliance score for each program object of said modified version of said first plurality of program objects, wherein each said compliance score comprises a percentage of relevant objects in a development system for which an applicable rule is satisfied:

enforcing, by said automated compliance verification software tool, compliance of a second plurality of program objects with said modified version of said first plurality of program objects, said second plurality of program objects comprised by a software application being verified for compliance with said compliance rules; and aggregating, by said automated compliance verification software tool, said compliance verification data with second compliance verification data comprised by an output of said second plurality of program objects.

8. The computing system of claim 7, wherein said verifying determines that said modified version of said first plurality of program objects is in accordance with said compliance verification data.

9. The computing system of claim 7, wherein said verifying determines that at least one program object of said modified version of said first plurality of program objects is not in accordance with said compliance verification data, and wherein said method further comprises:

flagging, by said automated compliance verification software tool, said at least one program object for a manual analysis; and preventing, by said automated compliance verification software tool, said at least one program object from being associated with said second plurality of program objects.

10. The computing system of claim 7, wherein said method further comprises:

generating, by said compliance software application, a new compliance rule, said generating said new compliance rule comprising using at least one attribute of said attributes to modify at least one rule of said first plurality of compliance rules.

11. The computing system of claim 7, wherein said method further comprises:

transforming, by said compliance software application, a first program object of said modified version of said first plurality of program objects into a second program object.

12. The computing system of claim 7, wherein said method further comprises:

removing, by said compliance software application, at least one attribute of said attributes for at least one program object of said modified version of said first plurality of program objects.

13. A process for supporting computer infrastructure, said process comprising providing at least one support service for at least one of creating, integrating, hosting, maintaining, and deploying computer-readable code in a computing system comprising a memory unit and a computer processor, said memory unit comprising a compliance software application, wherein the code in combination with the computing system is capable of performing a compliance method, said method comprising:

receiving, by said computing system, compliance data, said compliance data comprising a plurality of compliance rules from a plurality of different compliance domains, said plurality of compliance rules comprising a text format;

consolidating, by said compliance software application, said plurality of compliance rules;

determining, by said compliance software application, a programmatic format for said plurality of compliance rules;

converting, by said compliance software application, said plurality of compliance rules from said text format to a first plurality of program objects, said first plurality of program objects comprising said programmatic format;

defining, by said compliance software application, attributes for said first plurality of program objects, wherein said attributes comprise scope attributes and priority attributes, wherein said scope attributes comprise attributes associated with a specified programming language, a specified project, a specified development environment, and a specified operating system platform, and wherein said priority attributes comprise attributes requiring; immediate attention, urgent attention, and non-urgent attention;

modifying, by said compliance software application, said attributes for said first plurality of program objects;

generating, by said computer processor executing said compliance software application, a group of compliance standards, said group of compliance standards comprising a modified version of said first plurality of program objects, said modified version of said first plurality of program objects comprising inherited attributes from a rules template and modified attributes resulting from said modifying;

generating, by said compliance software application, a compliance report comprising an output of said modified version of said first plurality of program objects, said output of said modified version of said first plurality of program objects comprising compliance verification data;

enabling, by said compliance software application, an automated compliance verification software tool within said compliance software application;

comparing, by said automated compliance verification software tool, said modified version of said first plurality of program objects with said compliance verification data;

verifying, by said automated compliance verification software tool, if said modified version of said first plurality of program objects is in accordance with said compliance verification data;

calculating, by said compliance software application, a compliance score for each program object of said modified version of said first plurality of program objects, wherein each said compliance score comprises a percentage of relevant objects in a development system for which an applicable rule is satisfied:

enforcing, by said automated compliance verification software tool, compliance of a second plurality of program objects with said modified version of said first plurality of program objects, said second plurality of program objects comprised by a software application being verified for compliance with said compliance rules; and aggregating, by said automated compliance verification software tool, said compliance verification data with second compliance verification data comprised by an output of said second plurality of program objects.

14. The process of claim 13, wherein said verifying determines that said modified version of said first plurality of program objects is in accordance with said compliance verification data.

15. The process of claim 13, wherein said verifying determines that at least one program object of said modified version of said first plurality of program objects is not in accordance with said compliance verification data, and wherein said method further comprises:

flagging, by said automated compliance verification software tool, said at least one program object for a manual analysis; and preventing, by said automated compliance verification software tool, said at least one program object from being associated with said second plurality of program objects.

16. The process of claim 13, wherein said method further comprises: generating, by said compliance software application, a new compliance rule, said generating said new compliance rule comprising using at least one attribute of said attributes to modify at least one rule of said plurality of compliance rules.

17. The process of claim 13, wherein said method further comprises:

transforming, by said compliance software application, a first program object of said modified version of said first plurality of program objects into a second program object.

18. The process of claim 13, wherein said method further comprises:

removing, by said compliance software application, at least one attribute of said attributes for at least one program object of said modified version of said first plurality of program objects.

19. A computer program product, comprising a computer readable storage device storing a computer readable program code embodied therein, said computer readable program code comprising an algorithm that when executed by a computer processor of a computing system implements adapted to implement a compliance method within said computing system comprising a memory unit, said memory unit comprising a compliance software application, said method comprising:

receiving, by said computing system, compliance data, said compliance data comprising a plurality of compliance rules from a plurality of different compliance domains, said plurality of compliance rules comprising a text format;

consolidating, by said compliance software application, said plurality of compliance rules;

determining, by said compliance software application, a programmatic format for said plurality of compliance rules;

converting, by said compliance software application, said plurality of compliance rules from said text format to a first plurality of program objects, said first plurality of program objects comprising said programmatic format;

defining, by said compliance software application, attributes for said first plurality of program objects, wherein said attributes comprise scope attributes and priority attributes, wherein said scope attributes comprise attributes associated with a specified programming language, a specified project, a specified development environment, and a specified operating system platform, and wherein said priority attributes comprise attributes requiring; immediate attention, urgent attention, and non-urgent attention;

modifying, by said compliance software application, said attributes for said first plurality of program objects;

generating, by said computer processor executing said compliance software application, a group of compliance standards, said group of compliance standards comprising a modified version of said first plurality of program objects, said modified version of said first plurality of program objects comprising inherited attributes from a rules template and modified attributes resulting from said modifying;

generating, by said compliance software application, a compliance report comprising an output of said modified version of said first plurality of program objects, said output of said modified version of said first plurality of program objects comprising compliance verification data;

enabling, by said compliance software application, an automated compliance verification software tool within said compliance software application;

comparing, by said automated compliance verification software tool, said modified version of said first plurality of program objects with said compliance verification data;

verifying, by said automated compliance verification software tool, if said modified version of said first plurality of program objects is in accordance with said compliance verification data;

calculating, by said compliance software application, a compliance score for each program object of said modified version of said first plurality of program objects, wherein each said compliance score comprises a percentage of relevant objects in a development system for which an applicable rule is satisfied;

enforcing, by said automated compliance verification software tool, compliance of a second plurality of program objects with said modified version of said first plurality of program objects, said second plurality of program objects comprised by a software application being verified for compliance with said compliance rules; and aggregating, by said automated compliance verification software tool, said compliance verification data with second compliance verification data comprised by an output of said second plurality of program objects.

20. The computer program product of claim 19, wherein said verifying determines that said modified version of said first plurality of program objects is in accordance with said compliance verification data.

21. The computer program product of claim 19, wherein said verifying determines that at least one program object of said modified version of said first plurality of program objects is not in accordance with said compliance verification data, and wherein said method further comprises:

flagging, by said automated compliance verification software tool, said at least one program object for a manual analysis; and preventing, by said automated compliance verification software tool, said at least one program object from being associated with said second plurality of program objects.

22. The computer program product of claim 19, wherein said method further comprises:

generating, by said compliance software application, a new compliance rule, said generating said new compliance rule comprising using at least one attribute of said attributes to modify at least one rule of said plurality of compliance rules.

23. The computer program product of claim 19, wherein said method further comprises:

transforming, by said compliance software application, a first program object of said modified version of said first plurality of program objects into a second program object.

24. The computer program product of claim 19, wherein said method further comprises:

removing, by said compliance software application, at least one attribute of said attributes for at least one program object of said modified version of said first plurality of program objects.

* * * * *